United States Patent Office 3,361,645
Patented Jan. 2, 1968

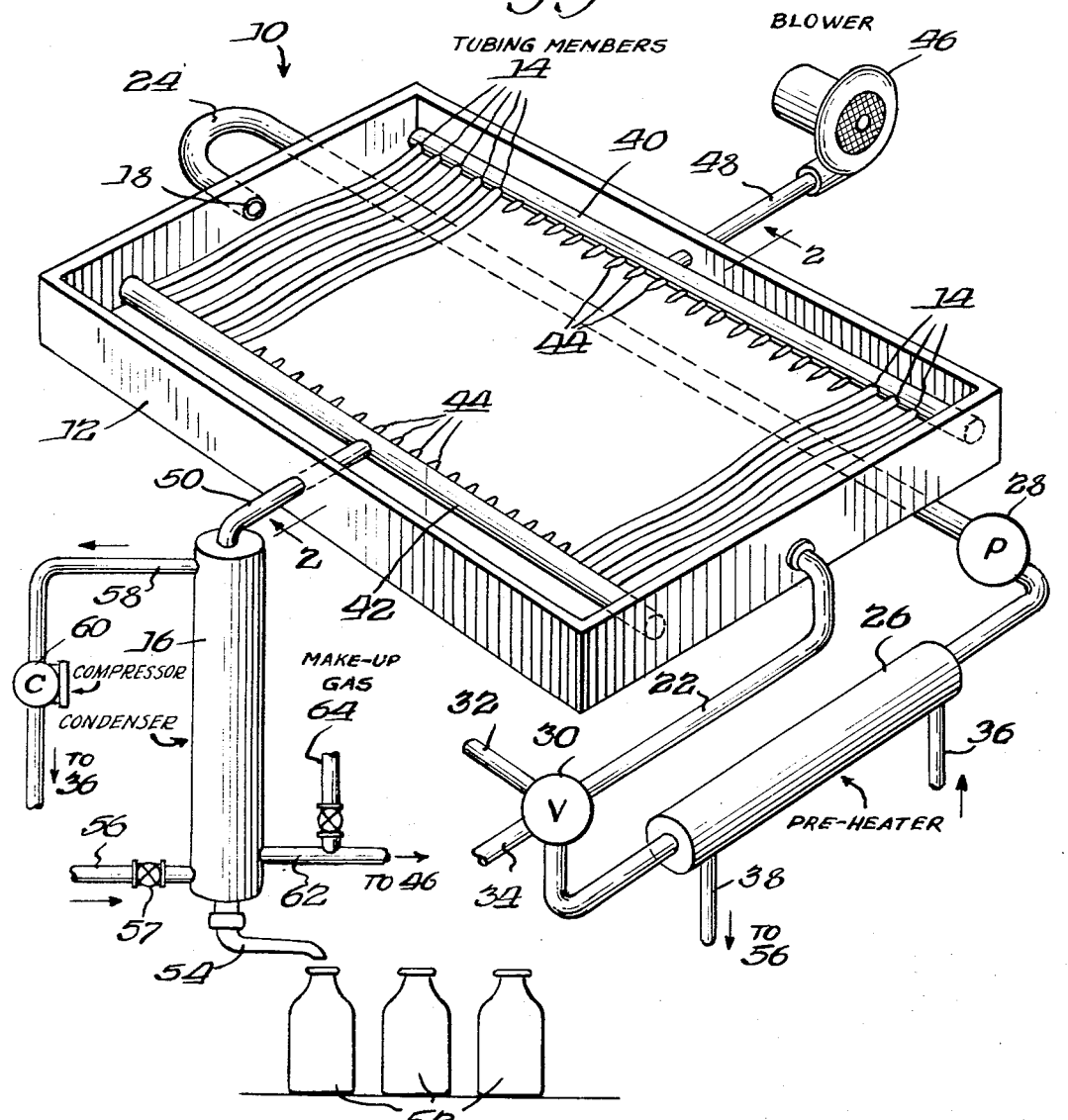
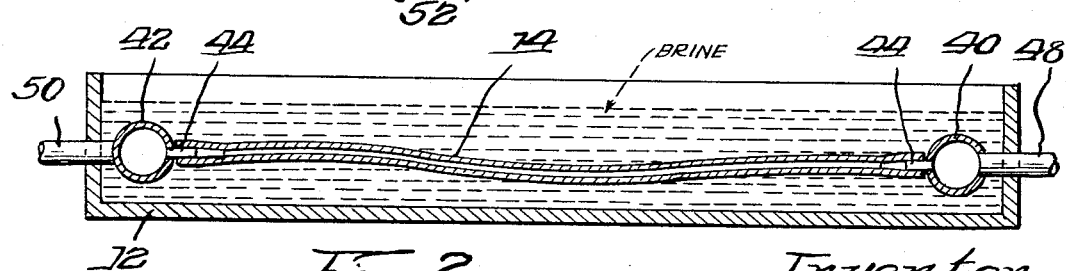

3,361,645
DISTILLATION OF SALINE WATER USING SILICONE RUBBER MEMBRANE
Bruce R. Bodell, 2400 Lakeview Ave., Chicago, Ill. 60614
Filed Aug. 9, 1966, Ser. No. 571,252
2 Claims. (Cl. 202—177)

ABSTRACT OF THE DISCLOSURE

Production of potable water is achieved wherein a membrane, impermeable to liquid water but permeable to water vapor allows for the passage of water vapor therethrough, but not impurities, into a gaseous medium from which potable water is recovered.

---

This application is a continuation-in-part of application Ser. No. 285,032 entitled "Silicone Rubber Vapor Diffusion in Saline Water Distillation" filed June 3, 1963 in the name of Bruce R. Bodell.

This invention relates generally to the art of water treatment and more particularly to apparatus and methods for converting impotable aqueous fluids to a potable water.

Expanding global population has combined with the prevalent pollution of many fresh water supplies and with the complete absence of fresh water supplies in arid regions to intensify the search for economical schemes of desalting sea water. Numerous approaches to solving this problem have been proposed in the past, and one rather common step in the prior art procedures has been the boiling of large quantities of brine to separate pure water vapor from the various salts. However, this process step requires considerable heat energy; and accordingly, procedures employing this step have proved rather costly.

Therefore, an important object of the present invention is to provide novel apparatus and methods for desalting sea water in an economical manner.

A more general object of the invention is to provide new and improved apparatus for extracting potable water from brine, sewage, urine, waste water, bacteria-containing water and other impotable water sources.

Another broad object of the invention is to provide a new and improved method for extracting potable water from impotable water sources.

A further object of the invention is to provide a method of desalting water, which method is characterized by a low energy requirement.

A still further object of the invention is to provide apparatus which simply and efficiently separates potable water from a saline solution.

These and other objects and features of the invention will become more apparent from a consideration of the following descriptions.

Apparatus in accordance with the invention includes a tank for water to be extracted, a capillary tubing member of vapor permeable, liquid impermeable membrane material disposed in the tank to define internally a gas passageway and to be exposed externally to the water to be extracted for effectuating transfer of water vapor therein, and a condenser connected to the tubing member for cooling the vapors passing therethrough whereby water vapor passing through the walls of the tubing member is condensed to a salt-free fluid.

The invention, as to its structure, mode of usage and process aspects, will be better understood by reference to the following disclosure and drawing forming a part thereof, wherein:

FIGURE 1 is a schematic perspective view of apparatus constructed in accordance with the principles of the present invention; and FIGURE 2 is an enlarged elevational view taken along the line 2—2 of FIGURE 1.

Referring now in detail to the drawing, specifically to FIGURE 1, a water purifying apparatus indicated generally by the numeral 10 is shown to include a tank 12, a number of capillary tubing members 14, and a condenser, or dehydrator, 16. The tank 12 may be of open or covered construction and is provided with an inlet 18 and an outlet 20. Dehydrator 16 may be of any suitable type such as indirect exchange with water or other refrigerant; or contact with silica gel, ethylene glycol, or other dessicant, followed by convention regeneration to recover the adsorbed or absorbed water.

Conduits 22 and 24 connect the inlet 18 and the outlet 20 in a fluid circuit externally of the brine tank 12; and a heat transfer unit 26 is connected in series with a recirculating pump 28 in this exterior circuit. A multiported valve 30 is connected in the conduit 22 between the outlet 20 and the heat transfer unit 26 in order to introduce make-up brine from line 32 and in order to discharge concentrated brine through a line 34. The heat transfer unit 26 receives heat transfer fluid from a line 36 and discharges it through a line 38, the unit 26 being of the steam jacketed type for example. If desired, the unit 26 may be supplied with heat from a solar boiler or other suitable means.

The recirculating pump 28 causes a flow of heated brine over and about the capillary tubing members 14; and these tubing members are connected to a manifold arrangement which includes an inlet header 40 and an outlet header 42. As will be seen in FIGURE 2, both of the headers are provided with tubular needle connectors 44. The tubular members 14 are individually connected between the headers 40 and 42 at the connectors 44 to define parallel gas passageways; and the inlet header 40 is connected to a blower 46 by a conduit 48 to direct atmospheric air or other substantially inert gas, such as nitrogen, having a water vapor pressure substantially below that of the brine, through the tubing members 14 and into the header 42. Preferably the water vapor pressure of the gas should be at least 30 millimeters of mercury below that of the aqueous medium. The gas from header 42 passes through a conduit 50 to the condenser 16 where water vapor is condensed to a potable fluid. This fluid is directed into carboys 52 or other suitable containers through an outlet 54. Coolant is circulated into the jacket of the condenser 16 through a conduit 56 having pressure release valve 57; and is withdrawn through a conduit 58. Gas from conduit 58 is compressed in compressor 60 and preferably charged to heat exchanger 26 through line 36 in order to cool the refrigerant prior to recirculating it to dehydrator 16 and to heat the brine or other aqueous material before charging it to tank 12. Dehydrated gas is recirculated through line 62 to header 40 by means of blower 46. Make-up air or gas may be added as required through valved pipe 64. The air is preferably filtered prior to charging it to header 40 in order to remove solid particles therefrom. An alternative means of providing low water vapor pressure in the tubes 14 would be to place the tubes under vacuum and discharge from the vacuum pump into the dehydrator. Care should be exercised when using vacuum not to collapse the tubes.

The capillary tubing members 14 are fabricated from a vapor permeable, liquid impermeable membrane material in order to pass water vapor from the brine into the air flowing through the interior of the tubing. A particularly alvantageous material for the tubing members 14 is silicon rubber such as that described in U.S. Patents Nos. 2,862,-575 and 2,966,235; and tubing having an internal diameter of 0.012 inch and an external diameter of 0.025 inch has been usefully employed. Other plastic materials which have low or negligible water absorption characteristics, but which have a relatively high permeability to water vapor, such as cellulose propionate, polyvinyl fluoride, and cellulose acetate, may be used in place of silicone rubber. Capillary tubing of this latter character is preferred to sheet membranes because of the substantially greater surface that is provided for any given mass of the membrane material. Tubing or membranes of greater or lesser thickness than about 0.01 inch may be used, but should be of a thickness which has sufficient physical strength not to rupture under operating conditions. The thinner the membrane or tubing, the more rapidly will water vapor permeate therethrough. In accordance with a feature of the invention, the tubing members 14 are connected to establish multiple parallel paths through the brine tank 12 in order to increase the volumetric flow of gases through the apparatus. Because the capillary membranes defined by the tubing members 14 readily pass water vapor from the surrounding liquid medium to the air flowing through the interior of the tubing members, it is unnecessary to elevate the temperature of the brine to substantially boiling condition. A substantial reduction in the energy required to convert the saline material to salt-free water is thus realized. Accordingly, the heat transfer unit 26 is operated to heat the brine to a selected temperature between ambient and boiling. For example, when ambient temperature is approximately 80° Fahrenheit, a brine temperature of approximately 135° Fahrenheit is adequate for operation of the water desalting apparatus 10.

It is advantageous to arrange the tubing members 14 so that they are loosely configured between the headers 40 and 42. The tubing members may thus float freely in the brine and respond readily to the currents in the flowing brine. This free movement which is permitted the individual tubing members insures intimate contact between the tubing members and the saline solution in which they are immersed. Maximum transfer of water vapor through the walls of the tubing members is thus encouraged.

Instead of contacting the tubes or membrane with the liquid brine or other impotable water, the brine or water may be charged to the treating chamber in such manner as to permit vapors thereof to contact the tubes or membrane, as for example in the form of a spray. It is not necessary that liquid brine be in contact with the tubes or membrane in order for the invention to function. Furthermore, where a sheet membrane is used to separate the brine compartment from the gas compartment, the sheet can be structurally supported by wire or perforated metal sheets and the gas side of the membrane be subjected to vacuum to aid the passage of water vapor therethrough.

Operation of the water desalting apparatus 10 is believed apparent from the foregoing descriptions.

Although the method and apparatus have been described in connection with the treatment of brine, it should be understood that the invention is applicable to preparation of potable water from other impotable aqueous mediums.

The example herein shown and described is to be considered as being primarily illustrative. Various changes in structure and arrangement will, no doubt, occur to those skilled in the art; and such changes are to be understood as forming a part of this invention insofar as they fall within the spirit and scope of the appended claims.

I claim:
1. Apparatus for producing potable water from saline water, the combination comprising means comprising a shallow open-top tank through which saline water to be treated is flowed from a source, an inlet conduit connected to one end of said tank for flowing saline water into said tank, a preheater connected to said inlet conduit for heating the saline water before the same enters the tank, a discharge outlet conduit connected to the opposite end of said tank for discharging saline water from the tank, an air manifold arrangement within said tank including an air inlet header and an air outlet header, said air inlet header and air outlet header extending longitudinally of the tank and disposed adjacent opposite side walls thereof, each of said headers comprising tubular needle connectors which are spaced longitudinally throughout the length of the headers, tubular members composed of water vapor-permeable silicone rubber individually connected between said headers and which define parallel passageways extending at right-angle to the flow of saline water through said tank for collecting and conveying air containing water vapor which permeates through the side walls of said vapor-permeable silicone rubber tubular members from the heated saline water flowing through said tank, a blower connected to said air manifold arrangement which is operable for forcing air through said tubular members to collect and convey away said water vapor which permeates through the walls of said tubular members, and a condenser connected to said air outlet header for condensing the water vapor conveyed from said tubular members to recover water distillate free of saline water.

2. Apparatus for producing potable water from saline water, comprising a tank through which saline water to be treated is flowed from a source, an inlet conduit connected to one end of said tank for flowing saline water into said tank, a preheater connected to said inlet for heating the saline water before the same enters the tank, a discharge outlet conduit connected to the opposite end of said tank for discharging saline water from the tank, air manifold arrangement including an air inlet header and an air outlet header, said headers being connected by tubular members composed of silicone rubber having water vapor-permeable walls and which define parallel passageways extending across the flow of saline water through said tanks for collecting and conveying air containing water vapor which permeates through the vapor-permeable walls of said tubular members from the heated saline water flowing through said tanks, means connected to said manifold arrangement for causing air to flow through said tubular members to collect and carry away said water vapor which permeates through the walls of said tubular members, and a condenser connected to said air inlet header for condensing the water vapor conveyed from said tubular members to recover water distilled free of saline water.

References Cited

UNITED STATES PATENTS

| | | | |
|---|---|---|---|
| 2,386,826 | 10/1945 | Wallach et al. | 210—23 |
| 2,433,741 | 12/1947 | Crawford | 55—16 |
| 2,506,656 | 5/1950 | Wallach et al. | 55—16 |
| 2,861,038 | 11/1958 | Steinmann | 210—23 |
| 2,966,235 | 12/1960 | Kammermeyer | 55—16 |
| 3,075,891 | 1/1963 | Elam | 202—188 |
| 3,129,146 | 4/1964 | Hassler | 203—10 |
| 3,250,080 | 5/1966 | Garwin | 55—16 X |
| 3,274,750 | 9/1966 | Robb | 55—16 |
| 3,303,105 | 2/1967 | Konikoff et al. | 203—11 |

FOREIGN PATENTS 894,936   4/1962   Great Britain.

NORMAN YUDKOFF, *Primary Examiner.*

F. DRUMMOND, *Assistant Examiner.*